US00RE34314E

United States Patent [19]

Forsberg

[11] E Patent Number: Re. 34,314

[45] Reissued Date of Patent: Jul. 20, 1993

[54] BLOCK WALL

[75] Inventor: Paul J. Forsberg, Prior Lake, Minn.

[73] Assignee: Keystone Retaining Wall Systems, Inc., Minneapolis, Minn.

[21] Appl. No.: 653,194

[22] Filed: Feb. 6, 1991

Related U.S. Patent Documents

Reissue of:

[64] Patent No.: 4,825,619
Issued: May 2, 1989
Appl. No.: 53,757
Filed: May 26, 1987

U.S. Applications:

[63] Continuation-in-part of Ser. No. 907,077, Sep. 15, 1986, abandoned.

[51] Int. Cl.[5] ..... E04C 1/00

[52] U.S. Cl. ..... 52/562; 52/169.1; 405/286

[58] Field of Search ..... 52/562, 169.1, 607, 52/608; 47/83; 405/286

[56] References Cited

U.S. PATENT DOCUMENTS

| | | | |
|---|---|---|---|
| 126,547 | 5/1872 | Hickco . | |
| 228,052 | 5/1880 | Frost . | |
| 237,704 | 11/1975 | Lane . | |
| 566,924 | 9/1896 | Morin . | |
| 810,748 | 1/1906 | Haller et al. . | |
| 1,092,621 | 4/1914 | Worner . | |
| 1,414,444 | 5/1922 | Straight . | |
| 1,456,498 | 5/1923 | Binns . | |
| 2,235,646 | 10/1941 | Schaffer . | |
| 2,882,689 | 4/1959 | Huch et al. . | |
| 2,963,828 | 12/1960 | Belliveau . | |
| 3,036,407 | 5/1962 | Dixon | 52/585 |
| 3,252,287 | 5/1966 | Suzuki . | |
| 3,274,742 | 9/1966 | Paul, Jr. et al. . | |

(List continued on next page.)

FOREIGN PATENT DOCUMENTS

| | | | |
|---|---|---|---|
| 170113 | 4/1982 | European Pat. Off. . | |
| 170113 | 2/1986 | European Pat. Off. . | |
| 3401629 | 6/1965 | Fed. Rep. of Germany . | |
| 2414202 | 10/1975 | Fed. Rep. of Germany . | |
| 392474 | 11/1908 | France . | |
| 1360872 | 4/1964 | France . | |
| 2216823 | 8/1974 | France . | |
| 84735 | 6/1920 | Sweden . | |
| 205452 | 6/1939 | Switzerland . | |
| 336 | of 1871 | United Kingdom | D25/113 |
| 14528 | of 1913 | United Kingdom | 52/712 |
| 1385207 | 2/1975 | United Kingdom . | |
| 2127872A | 4/1984 | United Kingdom . | |

OTHER PUBLICATIONS

The Besser Company Brochure "Paving Stone", Jun. 1984.

Concrete Masonry Pictorial, vol. 33, No. 3, C 1977, p. 35.

Standard Load Bearing Wall Tie, p. 11, The Hollow Building Tile Assoc., Jan. 1924.

The Besser Company Bulletin, Feb. 1985.

The Besser Company Brochure "Modular Concrete Block", 1984.

"How Big Is A Block" from May-Jun. 1972 issue of Building Standards.

"New Slumpstone", publication of Angelus Block Co., Inc.

Kawano Cement Catalog.

*Primary Examiner*—James L. Ridgill, Jr.
*Attorney, Agent, or Firm*—Dorsey & Whitney

[57] ABSTRACT

A retaining wall is made from a plurality of blocks arranged in rows superimposed on each other and pinned together. Each block has a body with an exterior face and rearwardly diverging side walls joined to a neck. A head having outwardly directed ears is joined to the neck. The body has holes and pockets for pins that interlock overlapped blocks together. A finishing block having a flat top surface is used to construct the top layer of the wall. A geogrid tie-back sheet having slots is located between layers of blocks and anchored to the pins stabilizes the wall.

52 Claims, 11 Drawing Sheets

U.S. PATENT DOCUMENTS 3,390,502 7/1968 Carroll .
3,430,404 3/1969 Muse .
3,557,505 1/1971 Kaul .
3,936,987 2/1976 Calvin .
3,995,434 12/1976 Kato et al. .
4,016,693 4/1977 Warren ..... 52/405
4,110,949 9/1978 Cambiuzzi et al. .
4,207,718 6/1980 Schaaf et al. .
4,208,850 6/1980 Collier .
4,228,628 10/1980 Schlomann .
4,229,123 10/1980 Heinzmann .
4,312,606 1/1982 Sarikelle ..... 405/286
4,324,508 4/1982 Hilfiker et al. ..... 405/284
4,335,549 6/1982 Dean, Jr. .
4,454,699 6/1984 Strobl .
4,496,266 1/1985 Ruckstuhl ..... 404/41
4,524,551 6/1985 Scheiwiller .
4,572,699 2/1986 Rinninger .
4,658,541 4/1987 Halle ..... 47/83
4,802,320 2/1989 Forsberg ..... 52/585
4,914,876 4/1990 Forsberg ..... 52/169.4

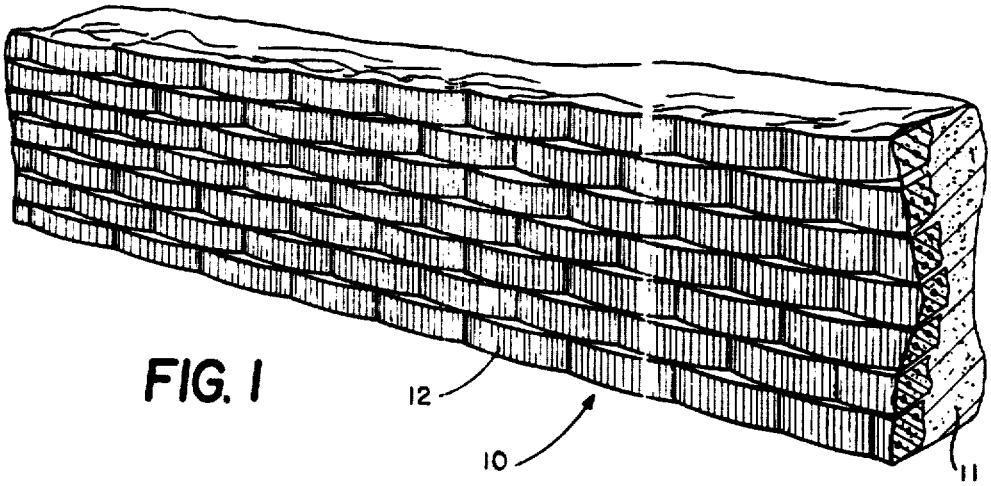
FIG. 1
FIG. 7
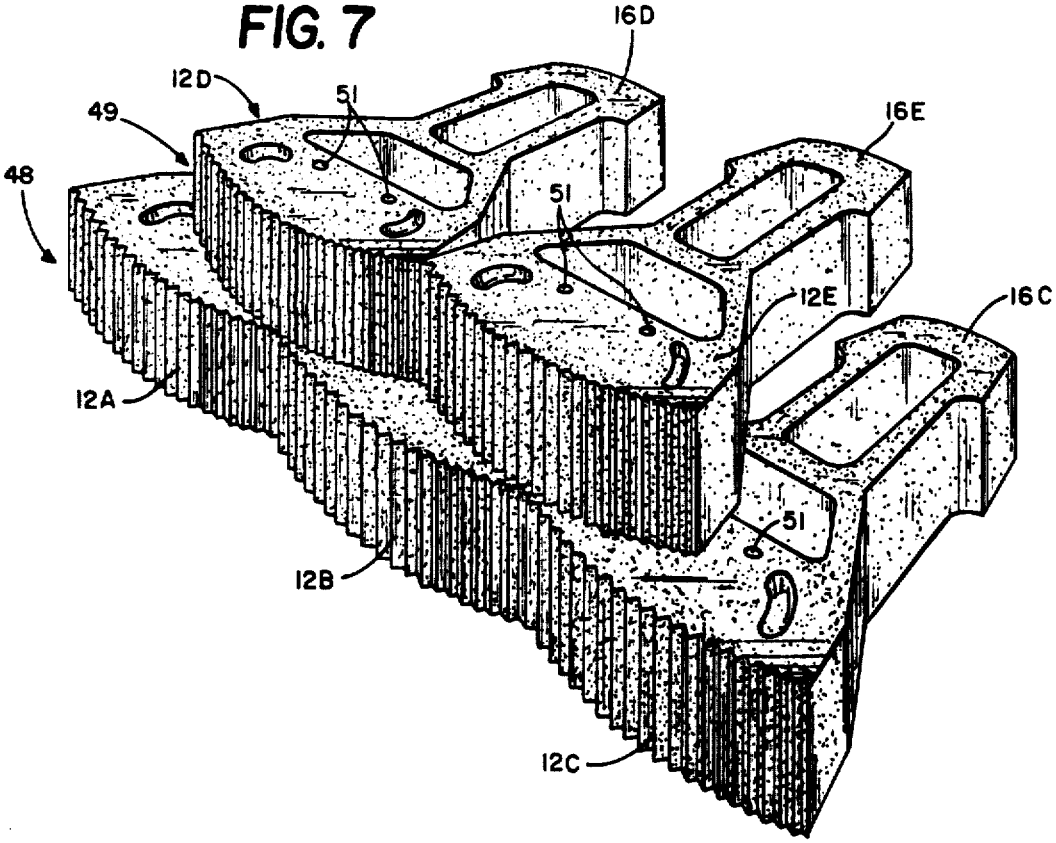

BLOCK WALL

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of U.S. application Ser. No. 907,077 filed Sep. 15, 1986, Abandoned. [U.S. application Ser. No. 116,228 filed Nov. 3, 1987 is a continuation of application Ser. No. 907,077.]

FIELD OF INVENTION

This invention is directed to the field of wall blocks and block wall construction. The blocks are of the type used to make retaining walls to secure terraces and embankments.

BACKGROUND OF INVENTION

Conventional retaining walls are used to secure earth embankments against sliding and slumping. Retaining walls are made of various types of concrete, solid masonry, wood ties, bricks, and blocks of stone and concrete. The blocks are placed in rows and superimposed on top of each other to form a wall. Examples of blocks used in the construction of retaining walls are shown by Heinzmann in U.S. Pat. No. 4,229,123 and Scheiwiller in U.S. Pat. No. 4,524,551. These patents disclose a plurality of block elements stacked on each other and located in rows to form retaining walls. The block elements have tongue and groove structures which allow adjacent rows of blocks to interengage each other to form generally upright walls. The block elements also have hollow interiors with open tops and bottoms for accommodating soil and plants. Solid walls use considerable amounts of material. They are also expensive and require considerable time and labor to construct. Block walls are satisfactory where the pressure behind the wall is not too great or the slope not to steep as the blocks are not connected together. The disadvantages of the prior retaining walls are overcome with the wall blocks and wall structure of the present invention.

SUMMARY OF INVENTION

The invention relates to retaining and wall structure made from a plurality of wall blocks interlocked together. The wall blocks are placed side-by-side and stacked on top of each other to form the wall structure. The wall structure can have a variety of shapes, such as linear, concave and convex curved, serpentine and circular to conform to the landscape utilization. The wall block can be made in miniature form and used as a construction toy. The wall structure is made of blocks formed from high density concrete. Each block has an attractive and decorative exterior face. A wall structure can be made with a plurality of interlocking wall blocks without the use of special tools with a minimum of time and labor. The wall block when used to construct a retaining wall is self-anchoring and provides an effective structure to retain the earth, including steep slopes, in a desired location.

The wall block has a body that has a convex curved front face which is the exterior surface of the block. The front face of the block can be smooth, serrated, horizontally grooved, vertically grooved, diagonally grooved, checkerboard or have an aggregate appearance. The front face of the block can be broken apart concrete or broken irregular pattern. The block is made of high density concrete that may be of any desired color including gray or earth tones and the like. The body has generally flat top and bottom surfaces so that the rows of blocks can be stacked or superimposed on top of each other. The adjacent rows of blocks are connected together with upright pins. Each block has holes to accommodate the pins. Rows of blocks overlap each other so that each block is pinned to a pair of adjacent blocks.

In one embodiment of the wall blocks, the body of the block has a pair of pockets located adjacent the opposite side walls thereof. The side walls extend rearwardly and taper inwardly from opposite ends of the front face. Holes located adjacent the pockets are used to accommodate upright pins that interconnect the adjacent courses of blocks. The side walls of the body are joined to a neck that terminates in the head. The head has oppositely directed anchoring ears. In addition to the anchoring ears, the body and neck are provided with upright openings to accommodate fill to facilitate the retention of the wall blocks in an earth embankment. The wall blocks of adjacent courses of the wall structure overlap or ar offset from each other. Pins extended through the holes in the body project into the pockets of adjacent blocks to interlock the wall blocks together. On site granular fill or imported fill, such as coarse sand or pea gravel, is used to fill all voids between the blocks and the passages through the blocks. Reinforcing tiebacks anchored on the pins that interlock the blocks together extend into the fill are used to increase the lateral and vertical stability of the retaining wall.

These objects and advantages of the wall block and wall structure of the invention and additional advantages thereof are embodied in the wall blocks and wall structure disclosed in the drawing and following detailed descriptions thereof.

DESCRIPTION OF DRAWING

FIG. 1 is a perspective view of a retaining block wall constructed according to the invention;

FIG. 7 is a top perspective view of a portion of the wall of FIG. 1 showing the overlapped rows of wall blocks;

DESCRIPTION OF PREFERRED EMBODIMENTS

Referring to FIG. 1, there is shown a retaining block wall indicated generally at 10 located adjacent a side of a hill or bank of earth 11. Wall 10 comprises a plurality of overlapping blocks 12 that are interlocked together. The blocks 12 are located in rows or courses which are superimposed on each other. Blocks 12 are used to make earth retaining walls and residental and commercial landscape walls having linear, circular, as well as convex and concave shapes. Block 12 is a high density one-piece concrete member that is dense, strong, and rugged. The blocks can be made of other rigid construction materials, such as plastic, plastic reinforced with fibers, ceramic, brink, wood, and metal. The following description of block 12 is directed to a concrete block.

Figure 2:
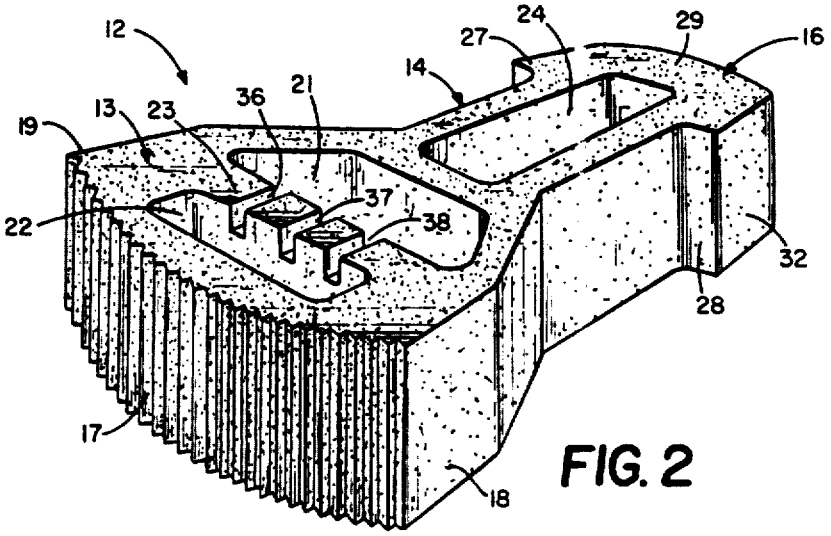
FIG. 2 is a perspective view of a block showing the bottom thereof used to construct the wall of FIG. 1.
Figure 3:
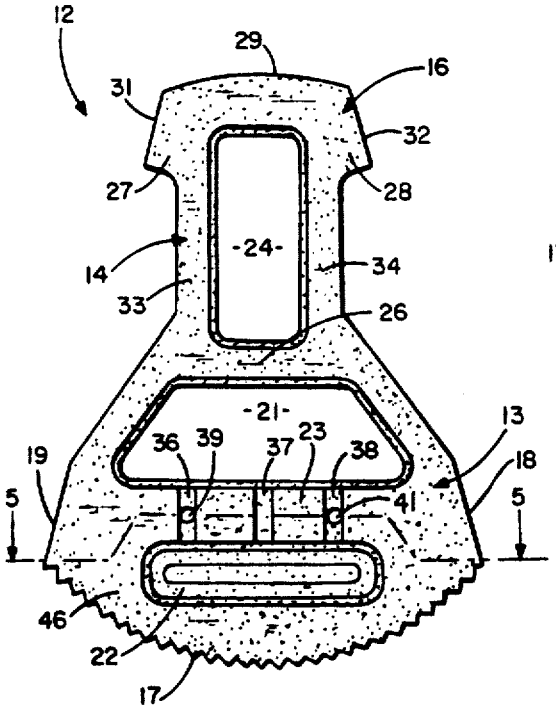
FIG. 3 is a bottom view of the block of FIG. 2.
Figure 4:
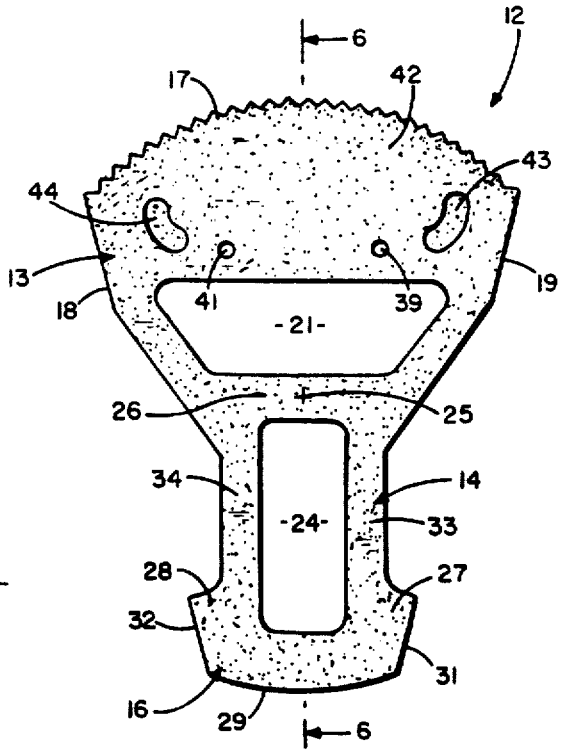
FIG. 4 is a top view of the block of FIG. 2.

As shown in FIGS. 2 to 4, block 12 has a body 13 joined to a neck 14. A head 16 is joined to the inner end of neck 14, body 13, neck 14, and head 16 form a one-piece concrete unit. Body 13 has a convex shaped exterior front face or front wall 17. Face 17 has a convex arcuate shape with a radius center 25 located along the mid line of the block at the longitudinal center of the block. Face 17 has a plurality of vertically spaced ribs. Exterior face 17 can have face patterns that are smooth, serrated, horizontally grooved, vertically grooved, diagonally grooved, checkerboard, or have an aggregate surface or broken split concrete. Examples of the types of outer surface configurations on the exterior face 17 are shown in U.S. Pat. Des. No. 297,464. The blocks disclosed in U.S. Pat. Des. No. 297,464 are incorporated herein by reference.

Body 13 has inwardly converging side walls 18 and 19 that converge to neck 14. Each side wall has an obtuse angular shape that converges from an end of front face 17 to neck 14. A transverse opening 21 having a generally trapezoidal shape is located between side walls 18 and 19. A transverse rectangular recess 22 is located between opening 21 and face 17. Recess 22 extends downwardly from the top of block 12 toward the bottom thereof. The bottom of recess 22 is open. An upright web 23 separates recess 22 from opening 21.

Neck 14 and head 16 have a common linearly elongated opening 24. Opening 24 has a rectangular shape orientated perpendicular or normal to opening 21. A short center web 26 separates opening 24 from opening 21. The block center 25 is located in web 26.

Head 16 has a pair of side ears 27 and 28 that extend forwardly from opposite ends of the convex curved end wall 29. Each wall 29 is a convex arcuate wall having a radius center at block dcenter 25. The radius of curvature of face 17 is the same as wall 29 as they are equidistant from block center 25. Ears 27 and 28 have rearwardly diverging side walls 31 and 32 that are generally in alignment with side walls 28 and 19 of body 13. Ears 27 and 28 extend outwardly in opposite direction from the neck walls 33 and 34 to facilitate the anchoring or holding of the block in soil, sand, gravel and the like.

Figure 5:
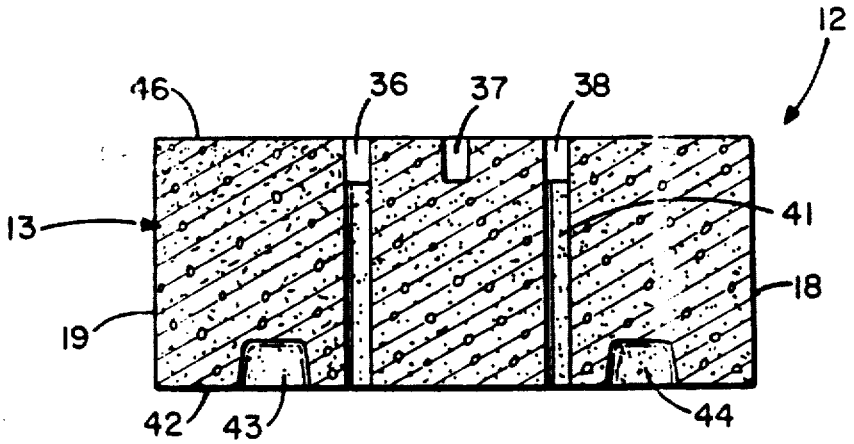
FIG. 5 is a sectional view taken along the line 5—5 of FIG. 3.
Figure 6:
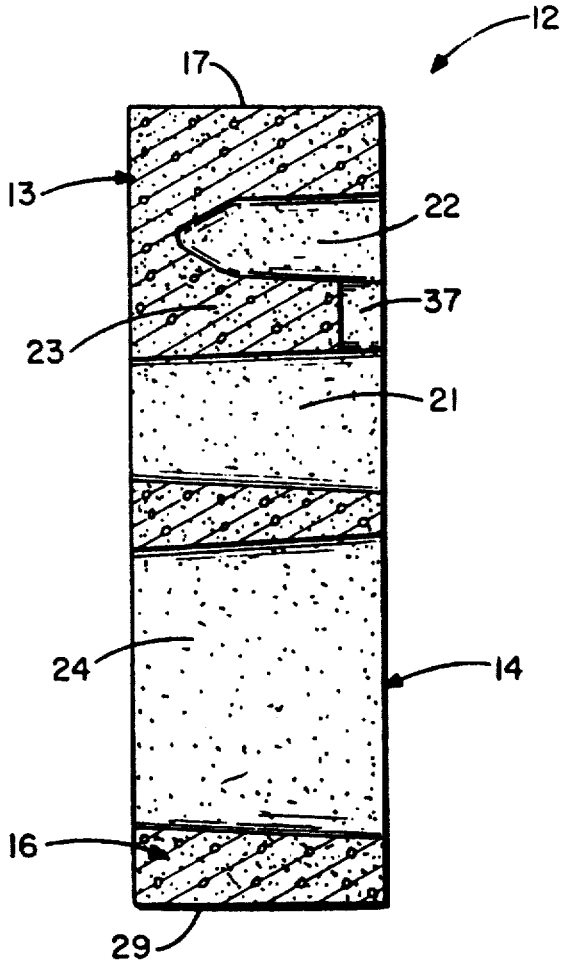
FIG. 6 is a sectional view taken along the line 6—6 of FIG. 4.
Figure 8:
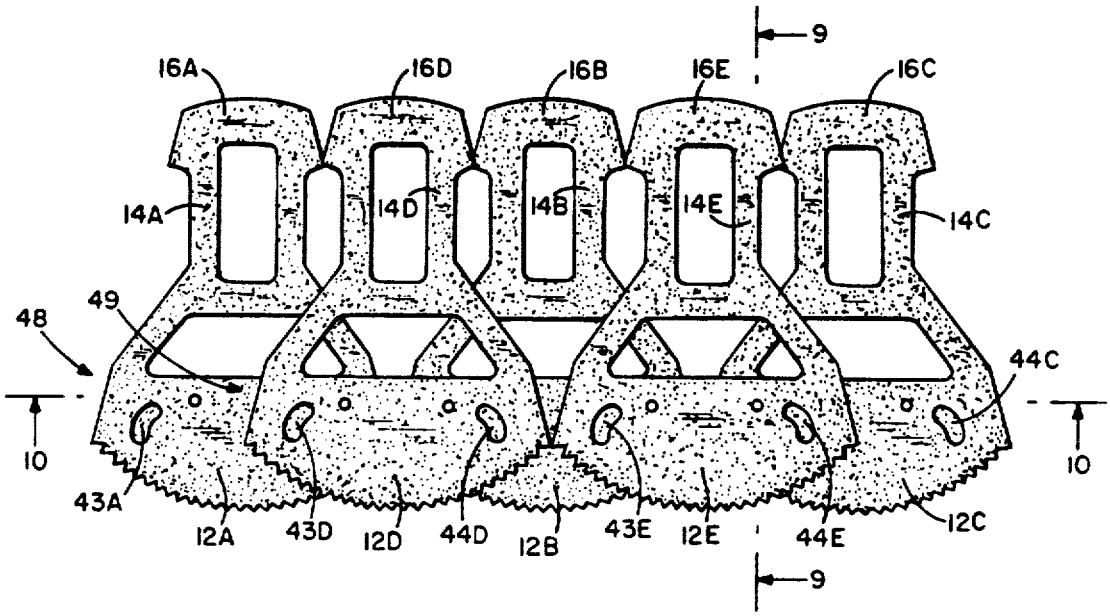
FIG. 8 is a top view of FIG. 7.

As shown in FIGS. 2 and 3, web 23 has grooves 36, 37, and 38 open to the bottom surface 46 of block 12 to allow water to drain from recess 22. A pair of holes 39 and 41 extend into head 16 from the bottom of grooves 36 and 38, as seen in FIG. 5. Holes 39 and 41 extend through head 16 and accommodate pins 51 and 52 that interlock layers of blocks together.

As shown in FIGS. 4 and 5, a pair of cup-shaped pockets or recesses 43 and 44 are located in body 13. Pockets 43 and 44 are open to the top surface 42 and are spaced outwardly from holes 39 and 41. As shown in FIG. 4, pockets 43 and 44 have generally arcuate shapes and extend outwardly toward face 17. The inner ends of pockets 43 and 44 are in general transverse alignment with holes 39 and 41. The pockets can be open to the bottom surface 46 of body 13.

As shown in FIGS. 7 to 10, wall 10 comprises a plurality of layers or courses of blocks. Two block layers 48 and 49 are shown in FIGS. 7 to 10. Additional layers of blocks are used to complete the wall to the desired height. The lower layer 48 comprises blocks 12A, 12B, and 12C. The top layer 49 comprises blocks 12D and 12E. Blocks 12A–12E are identical to block 12 shown in FIGS. 2 to 6. The parts of block 12 that correspond with the parts of blocks 12A to 12E have the same reference numbers with the suffixes A to E. The heads of each block with their outwardly directed ears anchor the block in the earth. Additional anchoring of the block is achieved with fill located in openings 21 and 24.

Figure 9:
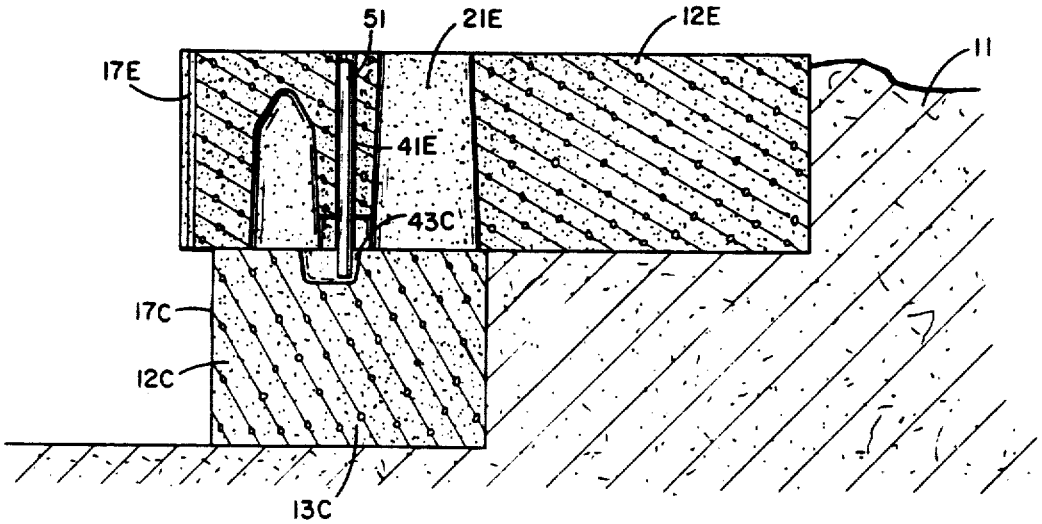
FIG. 9 is an enlarged sectional view taken along the line 9—9 of FIG. 8.
Figure 10:
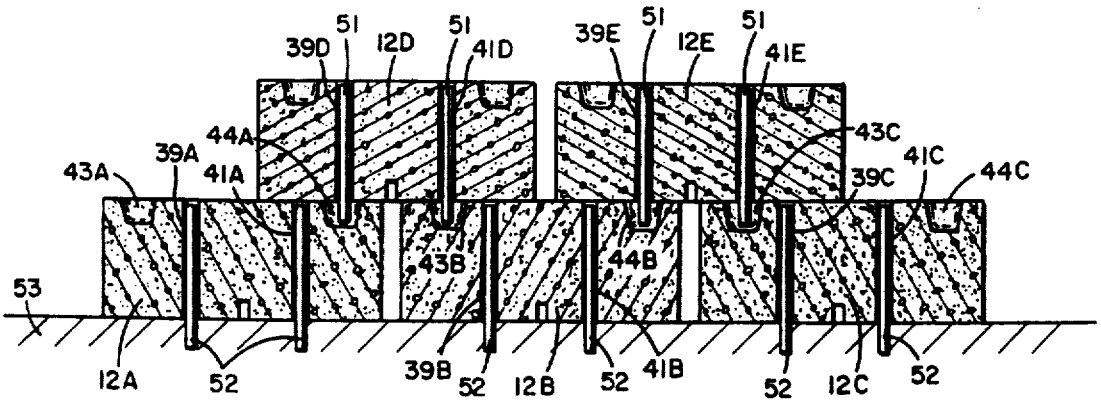
FIG. 10 is a sectional view taken along the line 10—10 of FIG. 8.
Figure 12:
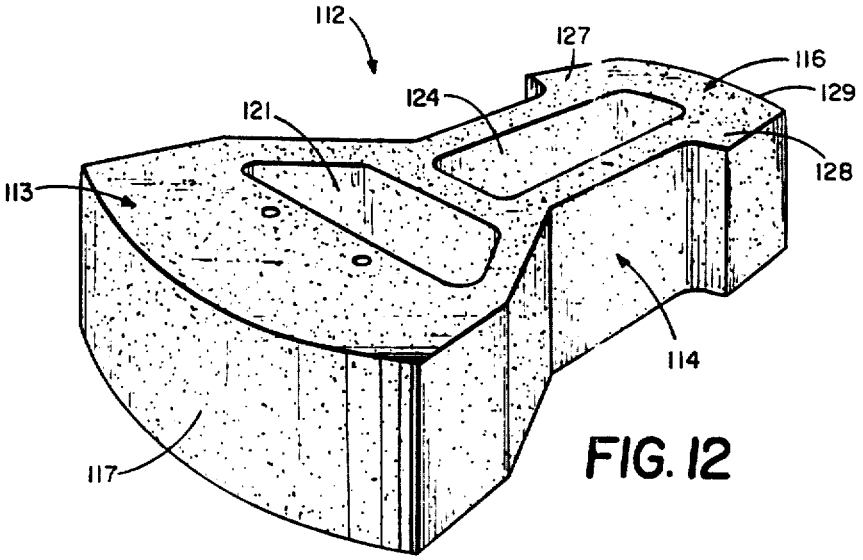
FIG. 12 is a perspective view of a modification of the block showing the top thereof used to construct a wall according to the invention.

A plurality of upright pins 51 interlock the row of blocks 12A, 12B, and 12C to the row of blocks 12D and 12E. Pins 51 are rigid rods made of metal or reinforced plastic, such as glass fiber impregnated plastic. As shown in FIG. 10, pins 52 extend downwardly into ground 53 and are located in holes 39A, 39B, 39C, and 41A, 41B, 41C. The lower end of pins 51 project into pockets 43B–43C and 44A–44B of blocks 12A–12C. The pocket 43C having a generally arcuate shape allows block 12E to be longitudinally positioned on top of block 12C in a desired position. As shown in FIG. 9, the front face 17E is offset from the front face 17C of block 12C. FIG. 10 shows the remaining pins 51 interlocking the stacked blocks together. A second set of pins mounted in holes in a third layer of blocks fit into the pockets 43D, 43E and 44E. Additional pins are used to interlock additional layers of blocks of wall 10. Alternate layers of blocks are positioned in overlapping relation so that each block is pinned to two blocks. This holds the rows of blocks together in side-by-side locations and prevents individual blocks from moving out away from the fill. Pins 51 and 52 and additional pins in cooperation with the pockets in the blocks allow adjacent blocks and layers of blocks to be located in linear, convex, and concave curved relationships. The layers of blocks can be vertically aligned on top of each other to form a generally vertical wall. Alternatively, the layers of blocks can be stepped or offset rearwardly to form rearwardly stepped upright wall.

Figure 11:
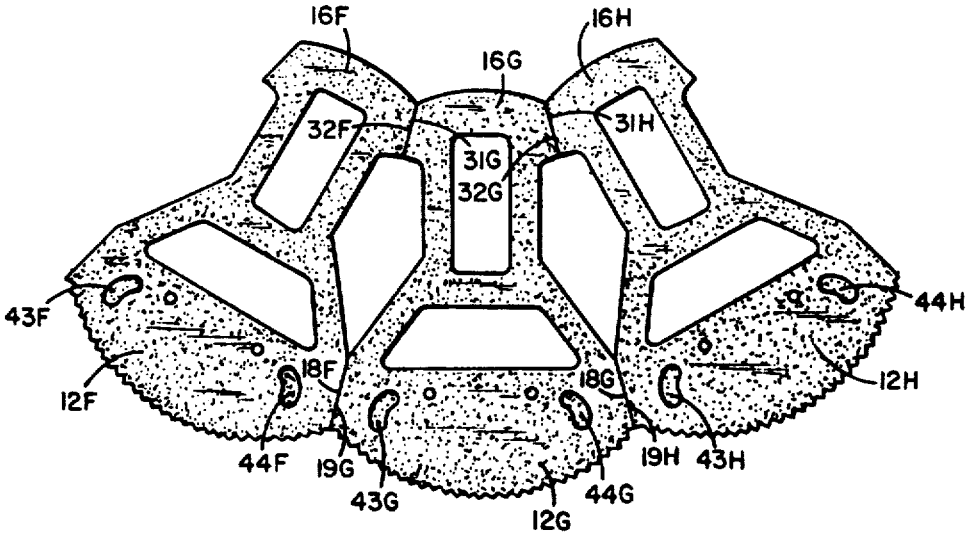
FIG. 11 shows an arrangement of the wall blocks to form a convex curved wall.

As shown in FIG. 11, blocks 12F, 12G, and 12H are identical to block 12. They are located in a convex curved arrangement. The adjacent side walls 18F, 19G, and 18G, 19H are located in engagement with each other. This positions the adjacent side walls 32F, 31G and 32G and 31H in engagement with each other. Each layer of blocks can have a convex curved configuration to form a convex curved wall.

A modification of the wall block, indicated generally at 112, is shown in FIGS. 12 to 17. Block 112 is similar in shape and form to block 12. Block 112 has a body 113 joined to a neck 114. The outer end of neck 114 is integrally attached to an enlarged head 116 which forms anchoring structure for the block. Body 113, neck 114, and head 116 are a one-piece concrete block. The block 112 is made of high strength high density semi-wet molded, concrete. Other materials, such as plastic, ceramic, wood, and metal can be used to make block 112.

Body 113 has a convex shaped exterior front face or front wall 117. Face 117 has a convex arcuate shape with a radius center 125 located along the mid-line of the block at the longitudinal center of the block. Face 117 is shown as having a smooth face pattern. Other types of face patterns such as vertical or horizontal scored, ribbed, exposed aggregate and the like can be used with the block.

Body 113 has inwardly converging side walls 118 and 119 that are joined to neck 114. Each side wall 118 and 119 has an obtuse angular shape that converges from an end of front face 117 to neck 114. A transverse opening 121 having a generally trapezoidal shape is located between side walls 118 and 119. A transverse generally rectangular recess 122 is located between opening 121 and face 117. Recess 122 extends downwardly from below the top of the block toward the bottom. The bottom of recess 122 is open. An upright web 123 separates recess 122 from opening 121. Neck 114 and head 116 have a generally radial rectangular shaped opening 124 orientated perpendicular or normal to opening 121. A short center web 126 separates opening 124 from opening 121. Block center 125 is located in the mid-section of web 126.

Head 116 has a pair of outwardly directed side ears 127 and 128 and a convex arcuate end wall 129. The radius of curvature of face 117 and end wall 129 is the same as they are equal distance from block center 125. Ears 127 and 128 extend outwardly in opposite directions from the neck side walls 131 and 132 respectively and form separate anchoring surfaces that cooperate with the compacted, granular fill, such as coarse sand, pea gravel, and the like, surrounding block 112 to anchor it in the fill.

Figure 13:
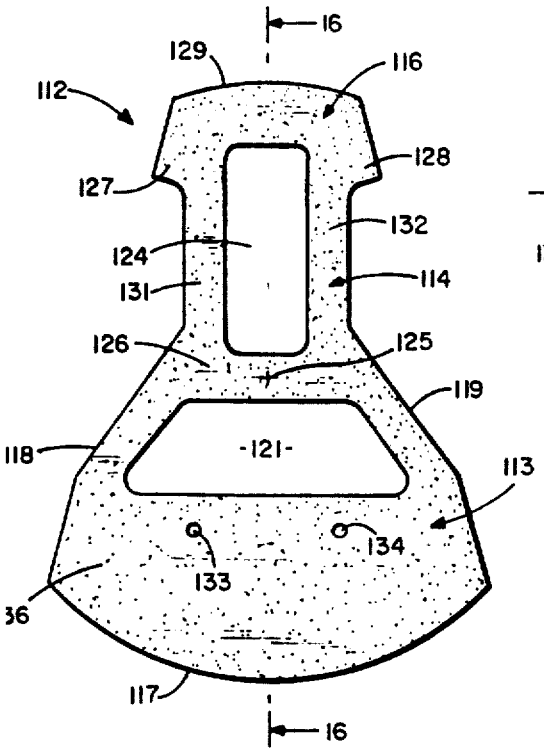
FIG. 13 is a top view of the block of FIG. 12.
Figure 14:
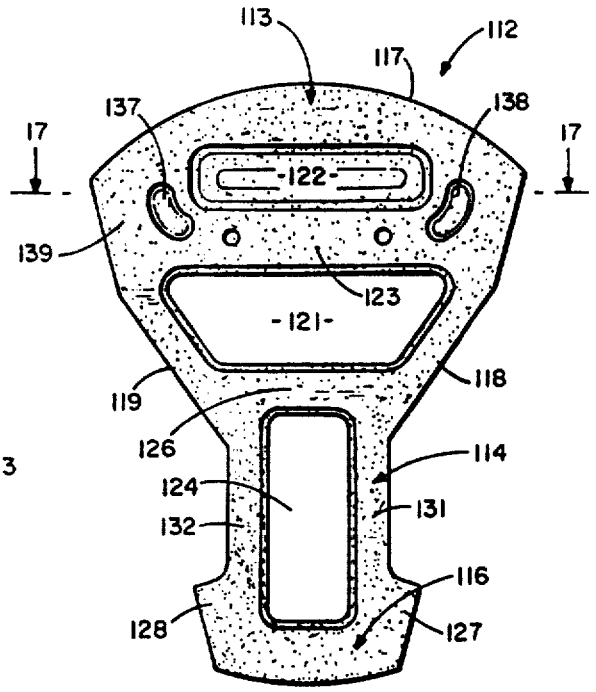
FIG. 14 is a bottom view of the block of FIG. 12.
Figure 15:
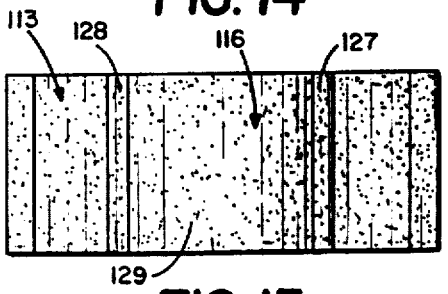
FIG. 15 is a rear elevational view of the block of FIG. 12.
Figure 16:
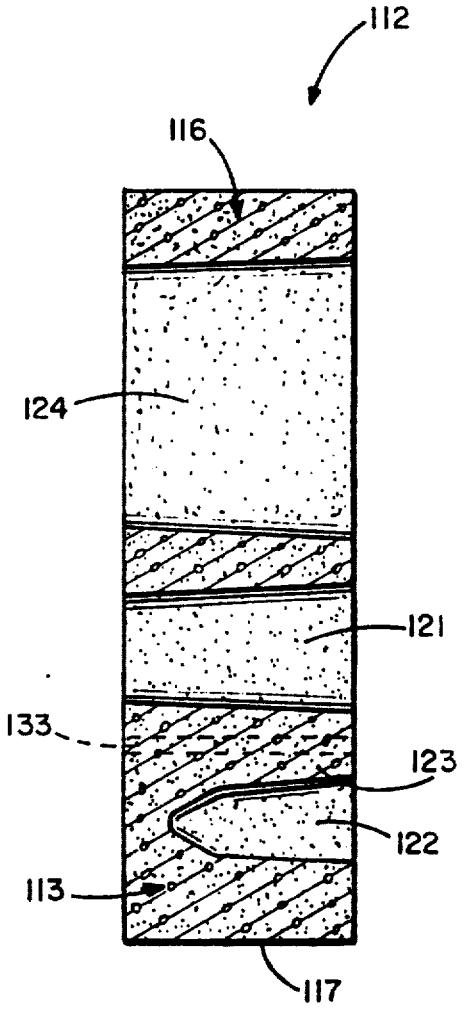
FIG. 16 is a sectional view taken along the line 16—16 of FIG. 13.
Figure 17:
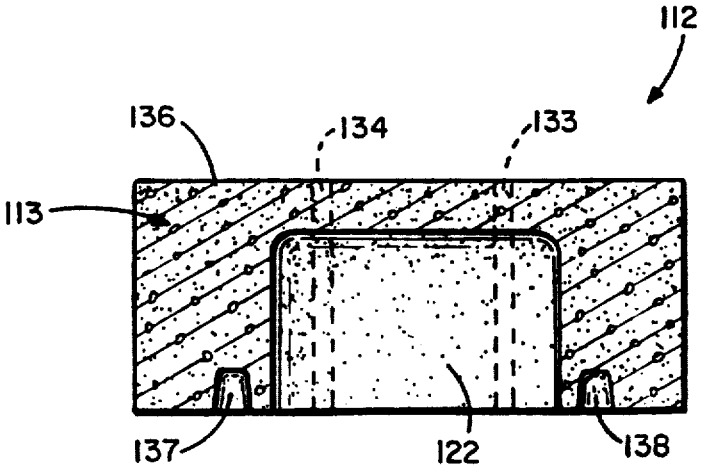
FIG. 17 is a sectional view taken along the line 17—17 of FIG. 14.
Figure 18:
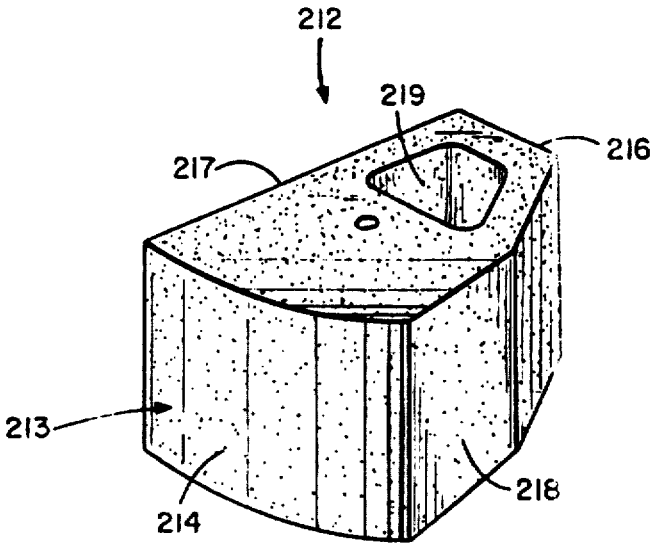
FIG. 18 is a perspective view of a starter block used in a retaining wall of the invention.
Figure 19:
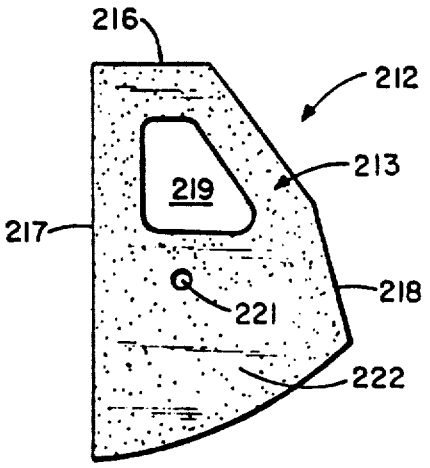
FIG. 19 is a top view of FIG. 18.

As shown in FIGS. 13 and 14, a pair of holes 133 and 134 extend through body 113 and are adapted to accommodate pins such as pins 51 and 52 used to interlock layers of blocks together. Preferably, the pins are glass fiber rods that fit into holes 133 and 134. The upper ends of the rods extend above the top surface 136 of block 112 and are adapted to fit into pockets or cup-shaped recesses 137 and 138 located in the bottom surface of the adjacent stacked block. As shown in FIG. 14, pockets 137 and 138 have generally arcuate shapes and are located adjacent opposite ends of webs 123. Pockets 137 and 138 are open to the bottom surface 139 of block 112.

A wall is made of a plurality of layers or courses of blocks 112. Preferably, the walls is located on a layer of compacted granular fill. The upright rods are forced into holes 133 and 134. The upper ends of the rods project into the pockets in the bottom of blocks to locate and interlock adjacent layers of blocks together. The rods when located in the pockets limit outward and lateral movement of the blocks relative to each other. The layers of blocks can have a set back to about one half inch per course. Reinforcing tie-backs, such as earth auger tie-backs, can be used with high retaining walls. Wall backfill is placed behind the wall for each layer of blocks. All voids in the blocks are filled with granular fill, such as well draining compactable granular fill or pea gravel.

Figure 20:
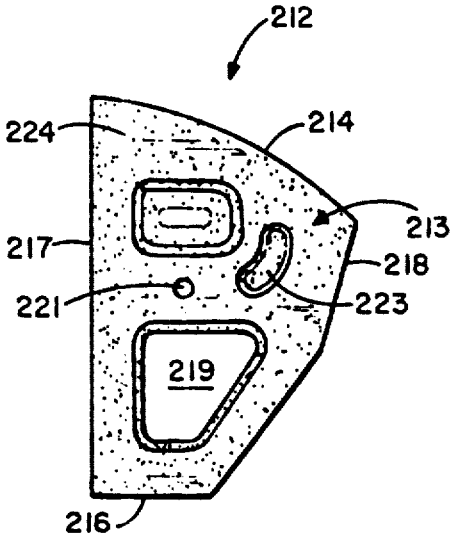
FIG. 20 is a bottom view of FIG. 18.
Figure 21:
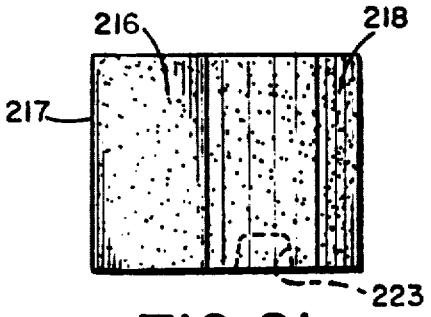
FIG. 21 is a rear elevational view of FIG. 18.

Referring to FIGS. 18 to 21, there is shown a starter block or module, indicated generally at 212, used to start a wall adjacent a vertical surface, such as a side of a building wall or the like. Block 212 has a body 213 with a convex curved front face 214. Face 214 has a vertical groove pattern that corresponds with the pattern of the remaining blocks of the wall. The opposite end of body 213 has a rear wall 216 joined to a straight side wall 217 and an obtused angled wall 218. Side wall 218 conforms to the shape and size of the side wall 18 of the block 12. Body 213 has an open 219 and a hole 221 open to the top surface 222 thereof. As shown in FIG. 20, the bottom of block 212 has an arcuate shaped pocket 223 open to the bottom surface 224. The starter blocks are made as right hand blocks and left hand blocks. The left hand blocks are the mirror image of the right hand blocks.

Figure 22:
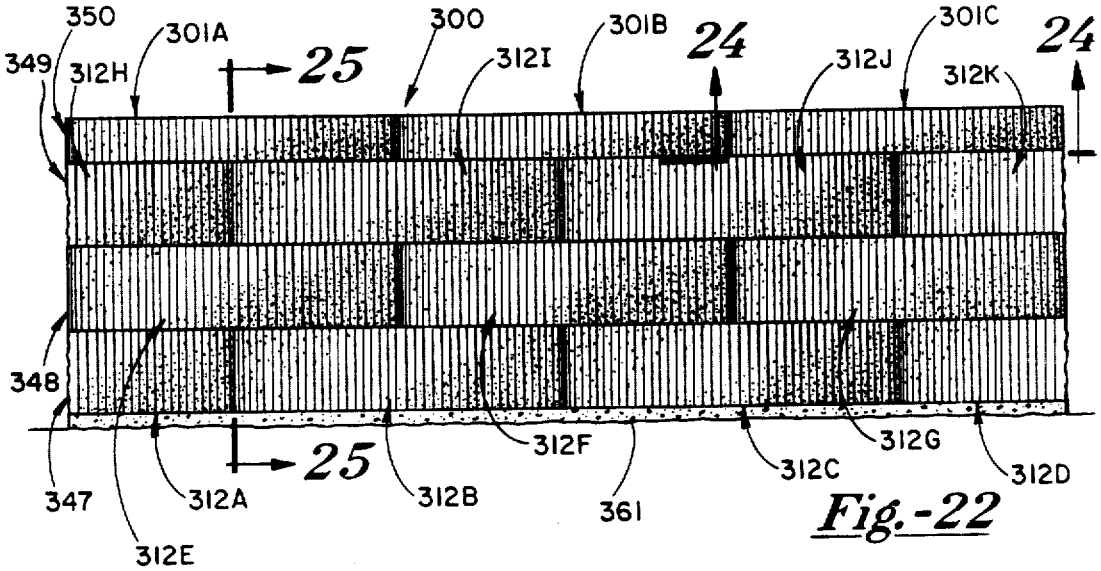
FIG. 22 is a front elevational view of a modification of the block wall of the invention.

A modification of the wall construction, indicated generally at 300, is shown in FIGS. 22 to 29. Wall 300 comprises a plurality of layers or courses of blocks indicated generally at 347, 348, 349 and 350. Preferably, the wall is located on a layer of compacted granular fill or other solid footing 361. Four block layers 347, 348, 349, and 350 are shown in FIG. 22. The lower layer 347 comprises blocks 312A, 312B, 312C, and 312D. The second layer 348 comprises blocks 312E, 312F, and 312G. The third layer 349 has blocks 312H, 312I, 312J, and 312K. Additional intermediate layers of blocks are used to construct the wall to the desired height. The length of wall 300 can vary as needed in the landscape site. Wall 300 can be linear, convex, curved, concave curved, or circular. The top layer 350 comprises blocks 301A, 301B, and 301C. Blocks 301A–301C are identical and disclosed in U.S. Pat. Des. No. 295,788. The block of U.S. Pat. Des. No. 295,788 is incorporated herein by reference. The following description is directed to block 301A. The blocks 301A–C and 312A–K are one-piece concrete blocks. The blocks are made of high strength high density semi-wet molded concrete. Other materials, such as plastic, ceramic, wood and metal can be used to make blocks 301A–C and 312A–K.

Figure 24:
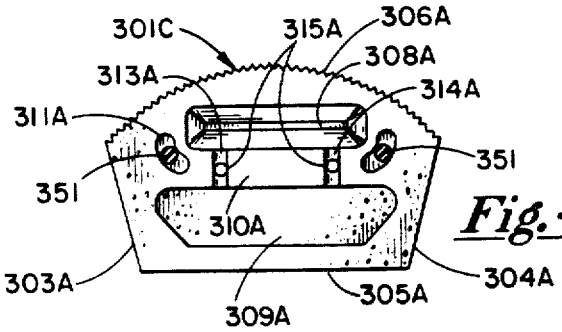
FIG. 24 is a sectional view taken along line 24—24 of FIG. 22.
Figure 23:
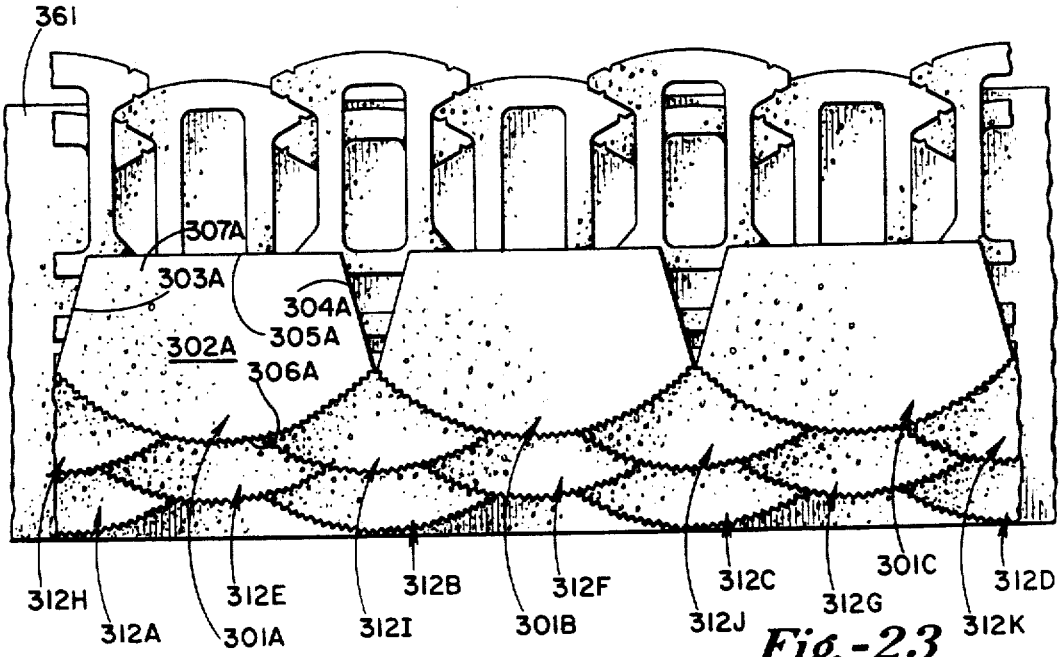
FIG. 23 is a top view of the wall of FIG. 22.

Referring to FIGS. 23 and 24, block 301A has a generally trapezoidal shaped body 302A with inwardly converging side walls 303A and 304A. Body 302A has a generally flat top 307A with a linear flat back wall 305A. Top 307A of block 301A has a continuous and uninterrupted top surface. Body 302A has a convex shaped exterior front face or wall 306A. Front face 306A is an arcuate segment of a cylinder having an axis located along the center longitudinal axis of block 301A. The radius of front face 306A is longer than the maximum width of block 301A. Face 306A is shown as having a face pattern comprising a plurality of vertically spaced ribs. Other types of face patterns, including split concrete, grooved, aggregrate, smooth and V-shaped, can be used with block 301A. Examples of face patterns for block 301A are shown in U.S. Pat. Des. No. 297,464 which is incorporated herein by reference. As shown in FIG. 24, transverse generally rectangular recess 308A is located adjacent the front face 306A. Recess 308A extends downwardly from below the top 307A of block 301A toward the bottom. A transverse second recess or groove 309A having a generally rectangular shape is located between side walls 303A and 304A. Groove 309A extends downwardly from below top 307A of block 301A toward the bottom. The bottom of recess 308A and groove 309A are open. An upright web 310A separates recess 308A from the groove 309A. Pockets 311A and 32A located in the bottom of block 301A adjacent opposite ends of web 310A accommodate pins 351 that lock block 301a onto blocks 312A and 312I. Grooves 313A and 314A in the bottom of block 301A are open to recess 308A and groove 309A to allow water to drain from recess 308A. Holes 315A are open to grooves 313A and 314A to accommodate pins 351 when an additional layer of blocks are stacked onto blocks 301A.

Figure 29:
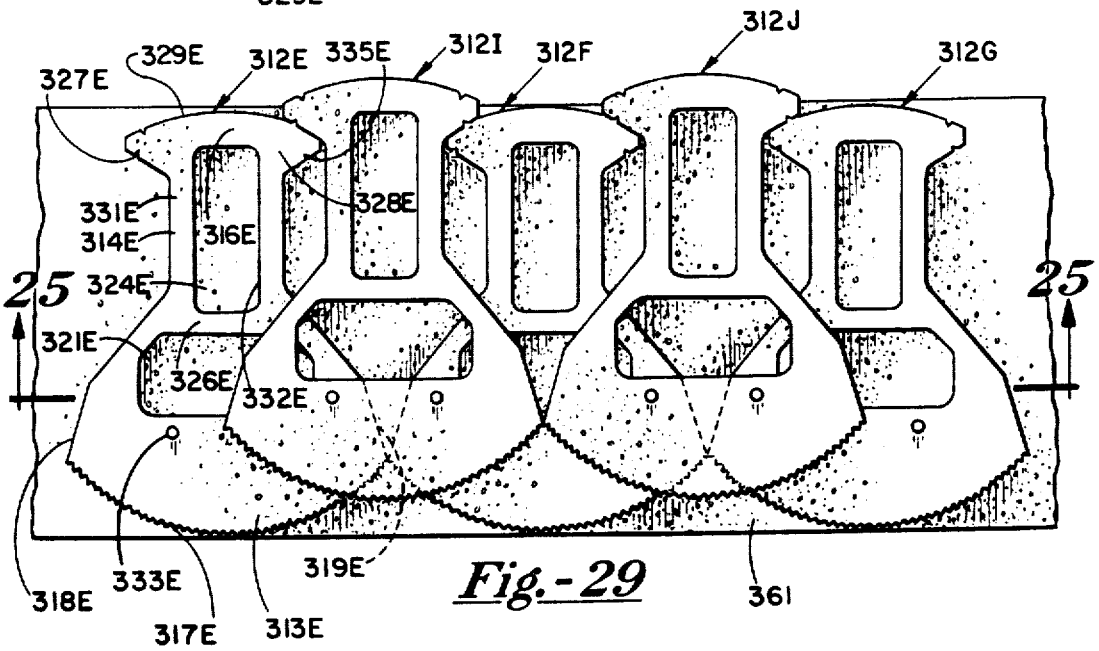
FIG. 29 is a top view of a wall with the top cap blocks removed.

Blocks 312A to 312K are similar in shape and form. As shown in FIG. 29, block 312E has a body 313E joined to a neck 314E. The outer end of neck 314E is integrally attached to an enlarged head 316E which forms an anchoring structure for the block 312E. Body 313E has a convex shaped exterior front face 317E. Face 317E is shown as having a face pattern comprising a plurality of vertically spaced ribs. Other types of face patterns, such as split concrete, grooved, aggregrate, smooth and V-shaped, can be used with the block. Examples of useable face patterns are disclosed in U.S. Pat. Des. No. 297,464. Body 313E has inwardly converging side walls 318E and 319E. A transverse opening 321E having a generally rectangular shape is located between side walls 318E and 319E. Neck 314E and head 316E have a generally radial rectangular shaped opening 324E oriented perpendicular to opening 321E. A transverse web 326E separates opening 324E from opening 321E.

Figure 25:
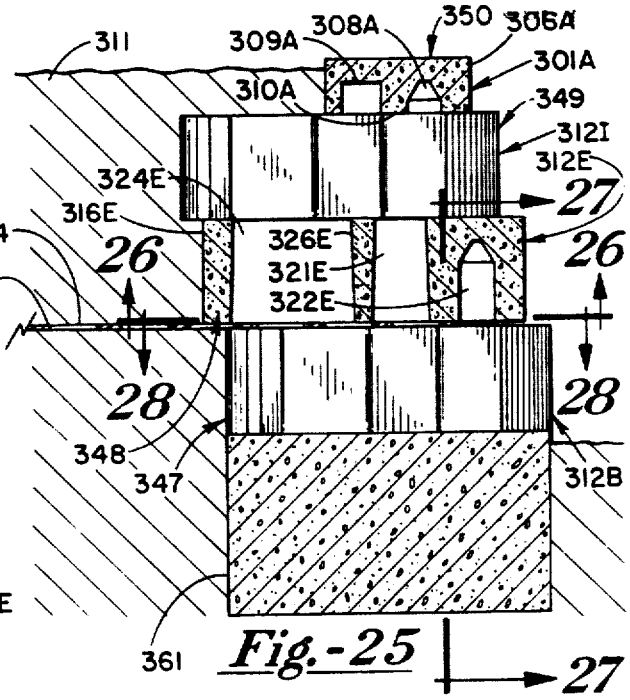
FIG. 25 is an enlarged sectional view taken along line 25—25 of FIG. 22.

As shown in FIG. 25, a transverse generally rectangular recess 322E is located between opening 321E and face 317E. Recess 322E extends downwardly from below the top of block 312E toward the bottom. The bottom of recess 322E is open. An upright web 323E separates recess 322E from opening 321E.

Returning to FIG. 29, head 316E has a pair of outwardly directed ears 327E and 328E and a convex arcuate and wall 329E. Ears 327E and 328E are generally triangular shaped and extend outwardly in opposite directions from the neck side walls 331E and 332E, respectively. The ears 327E and 328E form separate anchoring surfaces that cooperate with compacted granular fil 311 surrounding block 312E of anchor it in fill 311. Notches 335E in ears 327E and 328E are used as break lines whereby the ears 327E and 328E can be shortened so that the blocks can be arranged in a curved pattern, as shown in FIG. 11. Additional anchoring of block 312E is achieved by locating fill 311 in openings 321E and 324E. Blocks 312A to 312D and 312F to 312K are identical to block 312E.

Figure 26:
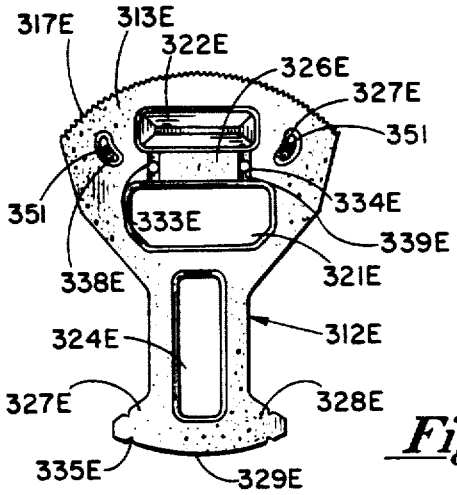
FIG. 26 is an enlarged sectional view taken along line 26—26 of FIG. 25.

The bottom of block 312E is shown in FIG. 26. A pair of pockets 337E and 338E are located adjacent opposite ends of web 326A. Pins 351 project up into pockets 337E and 338E to interlock block 312E with blocks 312A and 312B. Web 326E has a pair of grooves 339E open to recesses 321E and 322E to allow water to drain from the recesses. Holes 333E and 334E in web 326E are open to grooves 339E to accommodate additional pins used to interlock the next layer of blocks unto the top of block 312E.

Figure 27:
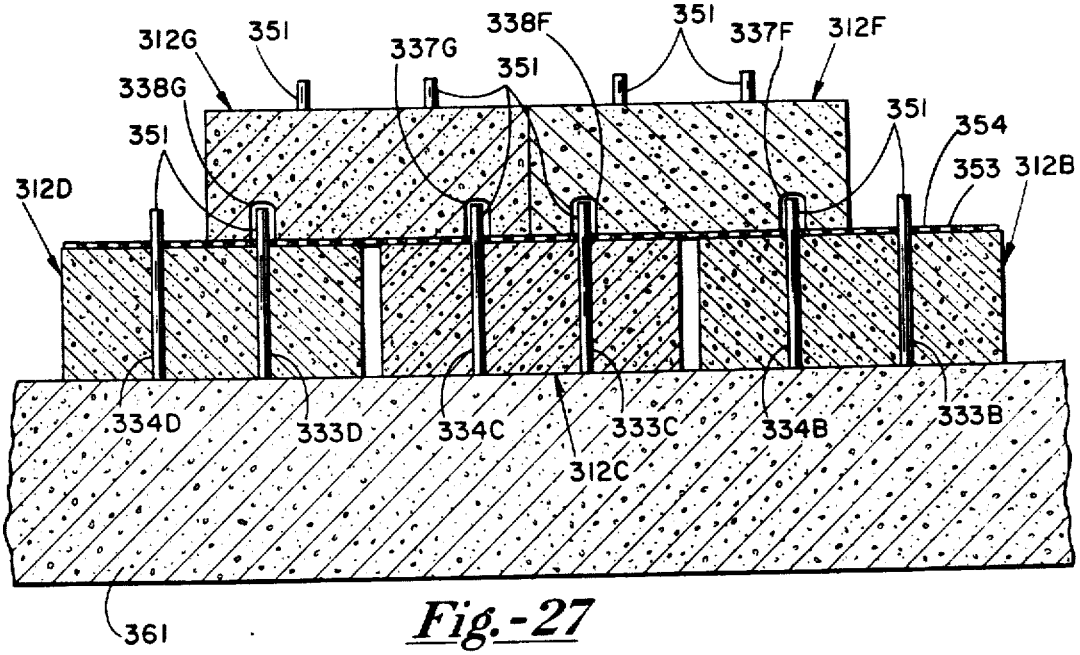
FIG. 27 is a sectional view taken along the line 27—27 of FIG. 25.

A plurality of upright pins 351 interlock the lower block layer 347 to block layer 348. Similarly, pins 351 interlock block layer 348 to layer 349 and layer 349 to the top block layer 350. As shown in FIG. 27, vertical pins 351 are located in holes 333B, 333C, 334B, 334C, and 334D extending through blocks 312B, 312C, and 312D. The upper ends of the pins 351 extend above the top surfaces of blocks 312B, 312C, and 312D and fit into pockets or recesses 337F, 337G, 338F, and 338G located in the bottom surface of the adjacent stacked blocks 312F and 312G.

A second set of pins 351 mounted in holes in block layer 348 fit into pockets in blocks 312H, 312I, 312J, and 312K. A third set of pins 351 mounted in holes in the block layer 349 fit into pockets in blocks 301A, 301B, and 301C. Additional pins are used to interlock additional layers of blocks of wall 300. Alternate layers of blocks are positioned in overlapping relation so that each block is pinned to two adjacent blocks. This holds the rows of blocks together in side-by-side locations and limits outward and lateral movement of the blocks relative to each other.

The pins 351 and additional pins in cooperation with the pockets in the blocks allow adjacent blocks and layers of blocks to be located in linear, convex and concave curved relationships. As shown in FIGS. 23 and 36, the block layers 347 to 350 are stepped or offset rearwardly to form a rearwardly stepped upright wall. For example, each layer of blocks can be offset rearwardly or into the fill 311 one half inch. The maximum amount of offset is determined by the length of the pockets 337E and 338E in the blocks. Alternatively, the layers of blocks can be vertically aligned on top of each other to form a generally vertical wall.

Figure 28:
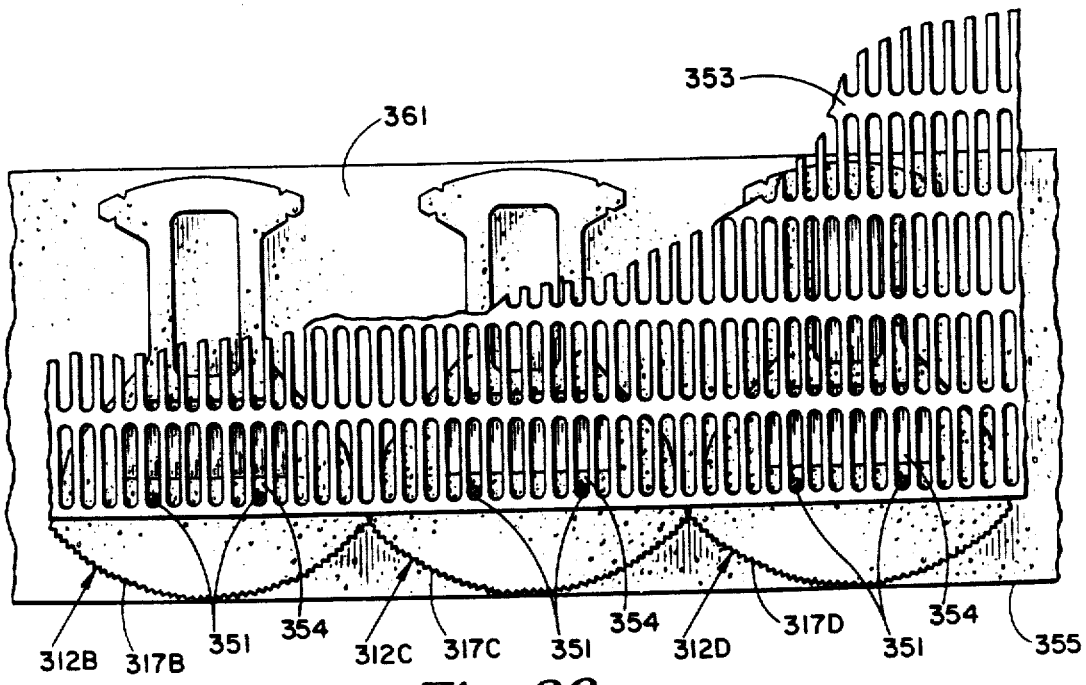
FIG. 28 is a sectional view taken along line 28—28 of FIG. 25.

Referring to FIGS. 27 and 28, reinforcing geogrid tie-back 353 is used to further anchor the blocks of wall 300 in fill 311. Tie-back 353 is a generally flat sheet made of flexible and high strength polymer plastic. Other materials, such as metal, wood, and hard rubber can be used as a tie-back. Tie-back 353 has a series of rows of elongated slots 354. The slots 354 are adapted to fit over the upper ends of pins 351 extending above the top of the blocks 312B–D. Pins 351, as shown in FIG. 28, anchor tie-back 353 to adjacent layers of blocks. The forward edge 355 of tie-back 353 is located rearwardly of the front faces 317B–317D of blocks 312B–312D so as not to detract from the appearance of the wall. As shown in FIG. 26, tie-back 353 extends rearwardly into fill 311 to maintain the positioning of the blocks. The quantity and placement of the tie-backs between layers of blocks in wall 300 varies according to soil conditions and job specifications. Generally, walls higher than six feet will require stabilization, either by terracing or using the tie-back 353.

While there has been shown and described preferred embodiments of the block wall and blocks of the invention, it is understood that changes in the shape, structure, and form, as well as materials from which the block is made may be made by those skilled in the art without departing from the invention. The invention is defined in the following claims.

The embodiments of the invention in which an exclusive property or privilege is claimed are defined as follows:

1. A wall construction comprising: a first row of blocks having a plurality of blocks arranged side-by-side, a second row of blocks having a plurality of blocks being located on top of the first row of blocks, each of said blocks having a vertical hole means, pin means extended through the hole means in the blocks of the second row of blocks, [and tie-back means anchored on said pin means adapted to be retained within fill located adjacent said wall construction,] each of said blocks having a body including a convex curved from face having opposite ends, a top surface, a bottom surface, and side walls extended rearwardly from opposite ends of the front face, each body having a pair of generally elongated pockets open to at least one of said surfaces thereof and located adjacent said side walls, said pin means having ends located in said pockets of vertically adjacent blocks, said body having said hole means for said pin means, said hole means comprising a pair of holes located adjacent each of said pockets for accommodating said ends of the pin means to interlock the blocks of the first and second rows of blocks together, a recess open to the bottom surface of the body spaced inwardly from said convex curved front face thereof, a first opening extended vertically through said body spaced inwardly from said recess, a web separating said recess from said opening, said holes being located in said web, said pockets being located adjacent ends of said web, a neck joined to the side walls and extended rearwardly therefrom, a head joined to the neck, said head having ears extended laterally from opposite sides of the neck, said neck and having a second opening extended vertically therethrough, and a second web separating the first opening from the second opening.

2. The wall construction of claim 1 wherein: each block of the second row of blocks overlaps two blocks of the first row of blocks, said pin means extended through each block of the second row of blocks into said two blocks.

[3. The wall construction of claim 1 wherein: said tie-back means comprised a sheet member having holes accommodating said pin means.]

4. The wall construction of claim 1 wherein: said first opening has a generally trapezoidal shape and said second opening has a rectangular shape.

5. The wall construction of claim 1 wherein: said pockets extend outwardly and in opposite side portions of said body.

6. The wall construction of claim 1 wherein: said pockets extend outwardly opposite portions of the front face of said body, each of said pockets having inner ends, said pair of holes comprising a first hole located adjacent the inner end of one pocket and a second hole located adjacent the inner end of the other pocket.

7. The wall construction of claim 1 wherein: said head has side walls linearly aligned with the side walls of the body.

8. The wall construction of claim 1 wherein: said front face has a plurality of grooves.

9. The wall construction of claim 1 wherein: each block has a neck joined to the side walls and extended rearwardly therefrom, and a head joined to said neck, said head having ears projected laterally from opposite sides of the neck.

10. The wall construction of claim 9 wherein: said head has side walls linearly aligned with the side walls of the body.

11. A wall construction coprising: a top row of blocks having a plurality of wall blocks arranged side-by-side, a second row of blocks having a plurality of blocks arranged side-by-side, said top row of blocks being located on top of the second row of wall blocks, each block of said top and second row of blocks having a body including a convex curved front face having opposite ends, a top surface, a bottom surface, and side walls extended rearwardly from opposite ends of the front face, said body having a pair of generally elongated pockets open to the bottom surface thereof located adjacent said side walls, said blocks of the second row of blocks having vertical hole means, and pin means extended through the hole means in the blocks of the second row into said pockets of the blocks of the top row to interlock the blocks of the second and top rows of blocks together[, and tie-back means anchored on said pin means adapted to be retained within fill located adjacent said wall construction].

12. The wall construction of claim 11 wherein: each body of the top row blocks has a first recess open to the bottom surface of the body spaced inwardly from said convex curved front face thereof, a second recess open to the bottom surface of the body spaced inwardly from said first recess, a web separating said first recess from said second recess, said pockets being located adjacent ends of said web, and a transverse back wall joined to the side walls.

[13. The wall construction of claim 11 wherein: said tie-back means comprises a geogrid tie-back member having a plurality of rows of elongated slots, said member being located between the first and second rows of blocks, said pin means extended through the slots in said member to anchor said member to the blocks.]

14. A retaining wall construction comprising: a first row of blocks having a plurality of wall blocks arranged side-by-side, a second row of wall blocks having a plurality of wall blocks arranged side-by-side, said second row of wall blocks being located on top of the first row of wall blocks, each of said blocks having vertical hole means, and pin means extended through the hole means in the blocks of the first row into generally elongated pockets in the blocks of the second row to interlock the blocks of the first and second rows of blocks together, each of said blocks having a body including a convex curved front face having opposite ends, a top surface, a bottom surface, and side walls extended between said top and bottom surfaces rearwardly from opposite ends of the front face, said side walls converging inwardly from said opposite ends of the front face to allow adjacent blocks of each row of blocks to be positioned along a curve, said body having said hole means open to the top surface thereof, said hole means including first hole means spaced away from and adjacent one of said side walls and inwardly of said front face, and a second hole means spaced from and adjacent the other of said side walls and located inwardly of said front face, said first and second hole means accommodating separate pin means to interlock adjacent blocks of the first and second rows of blocks together when positioned along said curve.

15. The wall construction of claim 14 wherein: said front face has a plurality of grooves.

16. The wall construction of claim 14 wherein: each wall block of the second row of blocks overlaps two wall blocks of the first row of blocks, said pin means comprising a first pin located in the first hole means of one of the two wall blocks and extended into one hole means of said wall block of the second row of wall blocks and a second pin located in the second hole means of said one of the two wall blocks and extended into another hole means of said wall block of the second row of wall blocks to interlock said wall block of the second row of blocks with said two wall blocks of the first row of blocks together.

17. The wall construction of claim 14 wherein: each block has a neck joined to the side walls and extended rearwardly therefrom, and a head joined to said neck, said head having ears projected laterally from opposite sides of the neck.

18. The wall construction of claim 17 wherein: said ears have a generally triangular shape.

19. The wall construction of claim 17 wherein: said ears have notches on opposite sides thereof.

20. A retaining wall construction comprising: a first row of blocks having a plurality of wall blocks arranged side-by-side, a second row of blocks having a plurality of wall blocks arranged side-by-side, said second row of wall blocks being located on top of the first row of wall blocks, each of said blocks having vertical hole means, pin means extended through the hole means in the blocks of the first row of blocks, each of said blocks having a body including a convex curve front face having opposite ends, a top surface, a bottom surface, and side walls extended between said top and bottom surfaces rearwardly from opposite ends of the front face, said side wall converging inwardly from said opposite ends of the front face, said hole means including first hole means spaced away from and adjacent one of said side walls and inwardly of said front wall, and a second hole means spaced from adjacent the other of said side walls and located inwardly of said front face, said first and second hole means accommodating separate pin means to interlock adjacent blocks of the first and second rows of blocks together, each body has a pair of generally elongated pockets open to one of the surfaces thereof, one of the pockets being located adjacent one of said side walls and the other of said pockets being located adjacent the other of said side walls, said pin means having ends located in said pockets of adjacent blocks in the second rows of blocks to interlock blocks of the first and second rows of blocks together, and said first and second hole means comprise a pair of holes accommodating the pin means one of said holes being located adjacent one of said pockets and the other of said holes being located adjacent the other of said pockets, a recess open to the bottom surface of the body spaced inwardly from said convex front face thereof, a first opening extended vertically through said body spaced inwardly from said recess, a web separating said recess from said opening, said holes being located in said web, said pockets being located in said web, a neck joined to the side walls and extended rearwardly therefrom, a head joined to the neck, said head having ears extended laterally from opposite sides of the neck, said neck and head having a second opening extended vertically therethrough, and a second web separating the front opening from the second opening.

21. The wall construction of claim 20 wherein: said ears have a generally triangular shape.

22. The wall construction of claim 20 wherein: said ears have notches on opposite sides thereof.

23. The wall construction of claim 20 wherein: said first opening has a generally rectangular shape and said second opening has a rectangular shape.

24. The wall construction of claim 20 wherein: said pockets extend outwardly and are located in opposite side portions of said body.

25. The wall construction of claim 20 wherein: said pockets extend outwardly toward opposite portions of the front face of said body, each of said pockets having inner ends, said pair of holes comprising a first hole located adjacent the inner end of one pocket and a second hole located adjacent the inner end of the other pocket whereby the pin means extended into the pockets locate the front faces of the blocks of the second row of blocks offset inwardly from the front faces of the first row of blocks.

26. A retaining wall construction comprising: a top row of blocks having a plurality of wall blocks arranged side-by-side, second row of blocks having a plurality of wall blocks arranged side-by-side, said top row of blocks being located on top of the second row of wall blocks, each block of said top and second row of blocks having a body including a convex curved front face having opposite ends, a top surface, a bottom surface, and side walls rearwardly from opposite-ends of the front face, said body having a pair of generally elongated pockets open to the bottom surface thereof located adjacent said side walls, said body having hole means open to the top surface thereof, and pin means extended through the hole means in the blocks of the second row into said pockets of the blocks of the top row to interlock the blocks of the second and top rows of blocks together.

27. The wall construction of claim 26 wherein: each body of the top row blocks has a first recess open to the bottom surface of the body spaced inwardly from said convex curved front face thereof, a second recess open to the bottom surface of the body spaced inwardly from said first recess, a web separating said first recess from said second recess, said pockets being located adjacent ends of said web, and a transverse back wall joined to the side walls.

[28. The wall construction of claim 26 including: tie-back means anchored on said pin means adapted to be retained within fill located adjacent said wall construction.]

[29. The wall construction of claim 28 wherein: said tie-back means comprises a geogrid tie-back member having a plurality of rows of elongated slots, said member being located between the first and second rows of blocks, said pin means extended through the slots in said member to anchor said member to the blocks.]

30. A retaining wall construction comprising: a first row of blocks having a plurality of wall blocks arranged side-by-side, a second row of blocks having a plurality of wall blocks arranged side-by-side, said second row of wall blocks being located on top of the first row of wall blocks, each of said blocks having vertical hole means, and pin means located in the hole means in the blocks of the second row to interlock the blocks of the first and second rows of blocks together, each of said blocks having a body including a front face having opposite ends, a top surface, a bottom surface, side walls extended rearwardly from said opposite ends of the front face to allow adjacent blocks of each row of blocks to be positioned along a curve, and generally elongated pockets open to at least one surface that accommodate one end of said pin means, said hole means including a first hole means in said body located adjacent one end thereof and a second hole means in said body located adjacent the other end thereof, said first and second hole means being open to the top surface of the body and accommodating said pin means when positioned along said curve.

31. The wall construction of claim 30 wherein: each body has first and second pockets open to one of said surfaces thereof, said first pocket being located adjacent one of said side walls, said second pocket being located adjacent the other of said side walls, said hole means including holes transversely aligned with said first and second pockets, said pin means being located in said holes and having ends positioned in said pockets of vertically adjacent blocks.

32. The wall construction of claim 30 wherein: each wall block of the second row of blocks overlaps two wall blocks of the first row of blocks, said pin means extended into aligned hole means in each wall block of the first row of wall blocks and said two wall blocks to interlock said wall block of the second row of blocks with said two wall blocks of the first row of blocks together.

33. The wall construction of claim 30 wherein: each of said blocks having a body with a convex curved front face.

34. The wall construction of claim 30 including: wall means connected to opposite end portions of the body of each block, said wall means extended rearwardly from the body.

35. The wall construction of claim 34 wherein: said wall means comprise a first wall extended rearwardly from one end portion of the body and a second wall extended rearwardly from the other end portion of the body.

36. A retaining wall construction comprising: a first row of blocks having a plurality of wall blocks arranged side-by-side, a second row of blocks having a plurality of wall blocks arranged side-by-side, said second row of wall blocks being located on top of the first row of wall blocks, each of said blocks having vertical hole means, and pin means located in the hole means in the blocks of the second row of blocks each of said blocks having a body including a front face having opposite ends, a top surface, a bottom surface, and side walls extended rearwardly from said opposite ends of the front face, said hole means including a first hole means in said body located adjacent one end thereof and a second hole means in said body located adjacent the other end thereof, said first and second hole means holes being open to the top surface of the body and accommodating said pin means, each body has first and second generally elongated pockets open to one of said surfaces thereof, said first pocket being located adjacent one of said side walls, said second pocket being located adjacent the other of said side walls, said pin means having ends located in said pockets of vertically adjacent blocks to interlock blocks of the first and second row of blocks together, and said first and second hole means comprising a pair of holes accommodating the pin means extended vertically through said body, one of said holes being located adjacent one of said pockets and the other of said holes being adjacent the other of said pockets, a recess open to the bottom surface of the body spaced inwardly from said front face thereof, an opening vertically through said body spaced inwardly from said recess, a web separating said recess from said opening, said holes being located in said web, said pockets being located adjacent opposite ends of said web, a neck joined to said side walls and extended rearwardly therefrom, a head joined to the neck, said head having ears extended laterally outward from opposite sides of the neck, said neck and head having a second opening extended vertically therethrough, and a second web separating the first opening from the second opening.

37. The wall construction of claim 36 wherein: said pockets extend outwardly and are located in opposite side portions of said body.

38. The wall construction of claim 36 wherein: said pockets extend outwardly toward opposite portions of the front face of said body, each of said pockets having inner ends, said pair of holes comprising a first hole located adjacent the inner end of the first pocket and a second hole located adjacent the inner end of the second pocket whereby the pin means extended into the pockets locate the front faces of the blocks of the second row of blocks offset inwardly from the front faces of the first row of blocks.

39. The wall construction of claim 36 wherein: said head has side walls linearly aligned with the side walls of the body.

40. A retaining wall construction comprising: a first row of blocks having a plurality of wall blocks arranged side-by-side, a second row of blocks having a plurality of wall blocks arranged side-by-side, said second row of blocks being located on top of the first row of wall blocks, each of said blocks having vertical hole means, pin means located in the hole means in the blocks of the second row, each of said blocks having a body including a convex curved front face having opposite ends, a top surface, a bottom surface, and side walls extended rearwardly from said opposite ends of the front face, said hole means including a first hole means in said body located adjacent one end thereof and second hole means in said body located adjacent the other end thereof, said first and second hole means being opened to the top surface of the body and accommodating said pin means, said body having a pair of generally elongated pockets open to the bottom surface thereof located adjacent said side walls, said pin means extended through the first and second hole means in the blocks of the first row into said pockets of the blocks of the second row to interlock the blocks of the first and second rows of blocks together.

41. The wall construction of claim 40 wherein: each body of the top row blocks has a first recess open to the bottom surface of the body spaced inwardly from said convex curved front face thereof, a second recess open to the bottom surface of the body spaced inwardly from said first recess, a web separating said first recess from said second recess, said pockets being located adjacent ends of said web, and a transverse back wall joined to the side walls.

[42. The wall construction of claim 40 including: tie-back means anchored on said pin means adapted to be retained within fill located adjacent said wall construction.]

[43. The wall construction of claim 42 including: said tie-back means comprises a geogrid tie-back member having a plurality of rows of elongated slots, said member being located between the first and second rows of blocks, said pin means extended through the slots in said member to anchor said member to the blocks.]

44. A retaining wall construction comprising a plurality of rows of blocks including: a first row of blocks having a plurality of wall blocks arranged side-by-side, a second row of wall blocks having a plurality of wall blocks arranged side-by-side, said second row of wall blocks being located on the top of the first row of wall blocks, each of said blocks having vertical hole means, and pin means extended through the hole means in the blocks of the first row of blocks, each of said blocks having a body including a convex curve front face having opposite ends, a top surface, a bottom surface, and side walls extended between said top and bottom surfaces rearwardly from opposite ends of the front face, said side walls converging inwardly from said opposite ends of the front face, said body having said hole means open to the top surface thereof, said hole means including first hole means spaced away from an adjacent one of said surface side walls and inwardly of the front face, and a second hole means faced from and adjacent the other of said side walls and located inwardly of said front face, each body having a pair of generally elongated pockets open to one of the surfaces thereof, one of the pockets being located adjacent one of sid side walls and the other of said pockets being located adjacent of said side walls, said pin means having ends located in said pockets of adjacent blocks to interlock the blocks of the first and second rows of blocks together, said first and second hole means comprise a pair of holes accommodating the pin means, one of said holes being located adjacent one of said pockets and the other of said holes being located adjacent the other of said pockets.

45. The wall construction of claim 44 wherein: the hole means and pockets are spaced from each other whereby the pin means extended into the pockets to locate the front faces of the blocks of the second row of blocks offset inwardly from the front faces of the first row of blocks.

46. A retaining wall construction comprising a plurality of rows of wall blocks including: a first row of blocks having a plurality of wall blocks arranged side-by-side, second row of blocks having a plurality of wall blocks arranged side-by-side, said second row of blocks being located on top of the first row of wall blocks, each of said blocks having hole means, and pin means located in the hole means of the blocks of the second row of blocks, each of said blocks having a body including a front face having opposite ends, a top surface, a bottom surface, and side walls extended rearwardly from the opposite ends of the front face, said hole means including a first hole means in said body located adjacent one end thereof and a second hole means in said body located adjacent the other end thereof, said first and second hole means being opened to the top surface of the body and accommodating said pin means, each body having a pair of pockets open to one of the surfaces thereof, one of the pockets being located adjacent one of said side walls and the other of said pockets being located adjacent the other of said side walls, said pin means having ends located in said pockets of adjacent blocks to interlock the blocks of the first and second rows of blocks together, said first and second hole means comprise a pair of holes accommodating the pin means, one of said holes being located adjacent one of said pockets and the other of said holes being located adjacent the other of said [generally elongated] pockets.

47. The wall construction of claim 46 wherein: the hole means and pockets are spaced from each other whereby the pin means extended into the pockets to locate the front faces of the blocks of the second row of blocks offset inwardly from the front faces of the first row of blocks.

48. A retaining wall construction comprising: a plurality of rows of wall blocks including: a first row of wall blocks having a plurality of wall blocks arranged side-by-side, and a second row of blocks having a plurality of wall blocks arranged side-by-side, said second row of wall blocks being located on top of the first row of wall blocks, pin means cooperating with said first and second rows of blocks to interlock the first and second rows of blocks together, each of said wall blocks having a body including a front face having opposite ends, a generally flat first surface, a generally flat second surface laterally spaced from and extended generally parallel to the first surface, and side walls extended between said first and second surfaces, said side walls converging inwardly toward each other from said opposite ends of the front face to allow adjacent blocks of each row of blocks to be positioned along a curve, said first surface of the body having recess means for accommodating said pin means to interlock the first and second rows of blocks together, said generally elongated recess means comprising a first generally elongated recess spaced inwardly of the front face and located adjacent one side wall, and a second generally elongated recess spaced inwardly of the front face and located adjacent other side wall, a first hole located adjacent the first recess extended into said body between said first and second surfaces, and a second hole located adjacent the second recess extended into said body between said first and second surfaces, said first and second holes accommodating said pin means, said pin means having ends projected from the body of one block and extended into a recess means of another block located on top of said one block whereby the pin means extended into recess means of adjacent wall blocks locate the front faces of the adjacent rows of wall blocks offset inwardly relative to each other when positioned along said curve.

49. The wall construction of claim 48 wherein: the first and second recesses are in general transverse alignment with each other, and the first and second holes are in general transverse alignment with each other, said first and second recesses and first and second holes are laterally spaced relative to each other.

50. The wall construction of claim 48 wherein: said first and second recesses are in general transverse alignment with each other.

51. The wall construction of claim 48 wherein: the first and second holes are in general transverse alignment with each other.

52. The wall construction of claim 48 wherein: said front face of each block has a non-smooth face pattern.

*53. A retaining wall construction comprising: first and second rows of blocks each having a plurality of retaining wall blocks adjacent to one another in side-by-side relationship, each of said retaining wall blocks comprising a body including a front face having opposite ends and top and bottom edges and a length defined by the distance between said opposite ends, a first surface, a second surface spaced from and extending generally parallel to said first surface, said first and second surfaces extending rearwardly from said top and bottom edges, and side walls extending between said first and second surfaces and rearwardly from said opposite ends of the front face, interlock means for interlocking adjacent retaining wall blocks with one another and for interlocking the blocks of the first row with*

*the blocks of the second row, a neck joined to the side walls and extending rearwardly therefrom, said neck having a lateral dimension measured in a direction parallel to the length dimension of said front face smaller than the length of said front face, a head joined to the rearward end of said neck and having a lateral dimension measured in a direction parallel to the length dimension of said front face greater than the lateral dimension of said neck and less than the length of said front face.*

*54. The retaining wall block of claim 53 including an opening extending through at least a portion of said neck.*

*55. The retaining wall block of claim 54 wherein said opening extends through at least a portion of said head.*

*56. The retaining wall block of claim 53 wherein said interlock means includes first hole means open to said first surface and second hole means open to said second surface, said first and second hole means adapted to accommodate pin means.*

*57. The retaining wall block of claim 56 wherein said first and second hole means are positioned such that the first hole means of a block in the first row and the second hole means of a block in the second row are adapted to accommodate a common pin.*

*58. The retaining wall block of claim 53 wherein said interlock means includes means facilitating the blocks in one of the first and second rows to be offset rearwardly relative to the blocks in the other.*

* * * * *